Sept. 7, 1943.     D. KELLER     2,329,056
SOLDER CUTTING MACHINE
Filed May 8, 1943     3 Sheets-Sheet 1
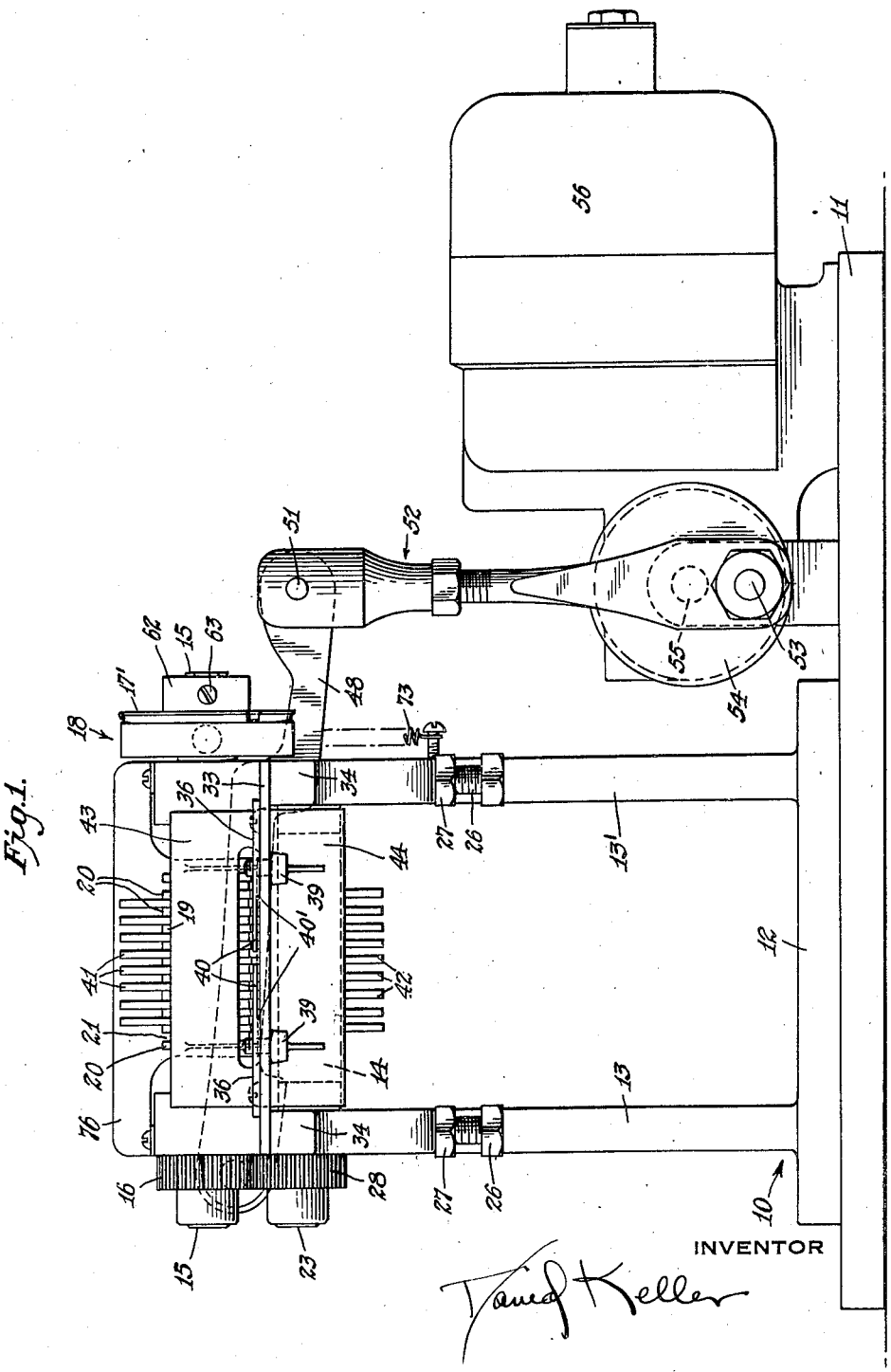
INVENTOR Sept. 7, 1943.  D. KELLER  2,329,056
SOLDER CUTTING MACHINE
Filed May 8, 1943  3 Sheets-Sheet 2
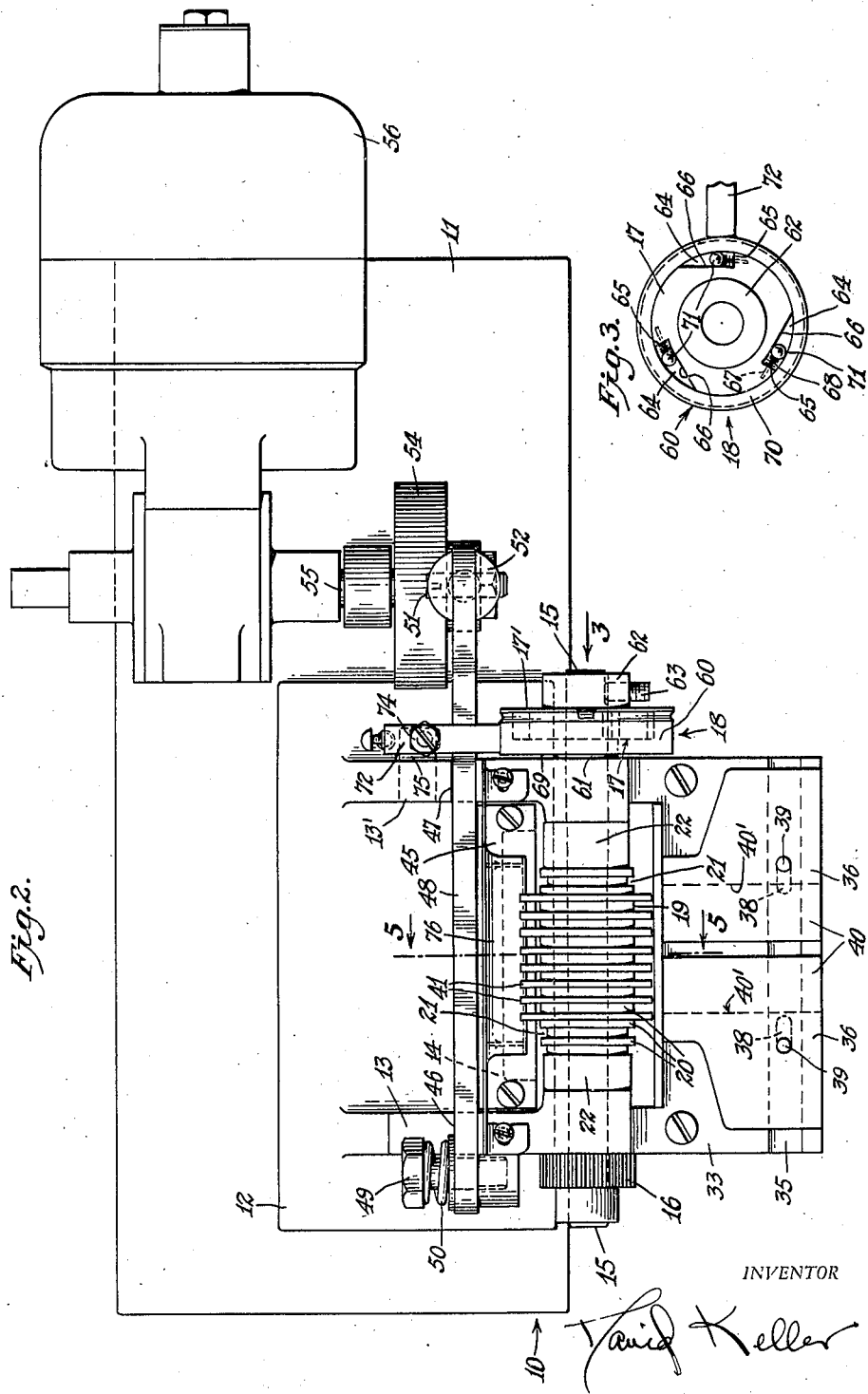
INVENTOR
David Keller Sept. 7, 1943.   D. KELLER   2,329,056
SOLDER CUTTING MACHINE
Filed May 8, 1943   3 Sheets-Sheet 3
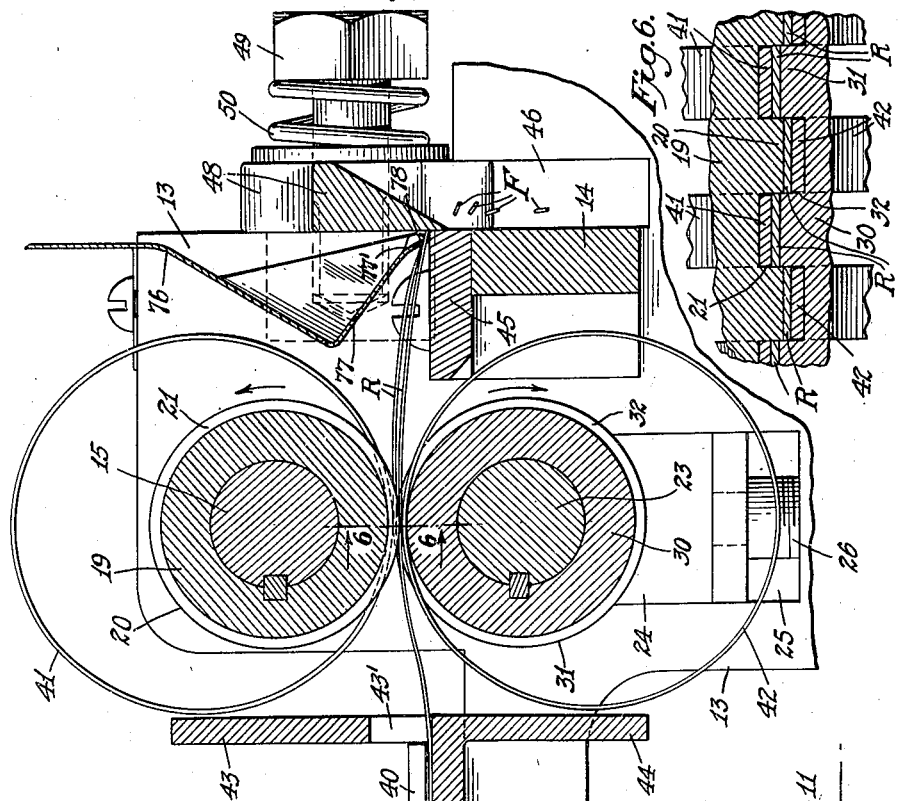
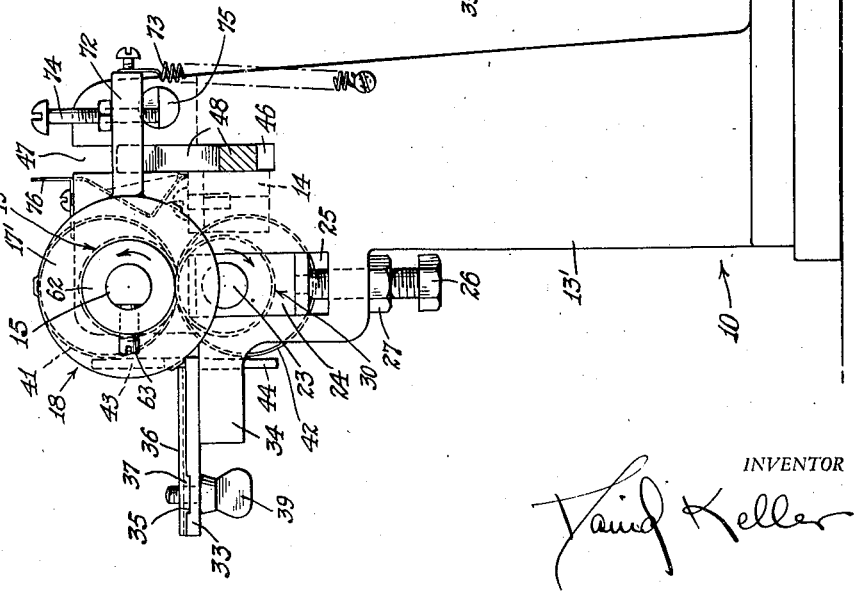
INVENTOR Patented Sept. 7, 1943

2,329,056

UNITED STATES PATENT OFFICE 2,329,056

SOLDER CUTTING MACHINE

David Keller, Brooklyn, N. Y.

Application May 8, 1943, Serial No. 486,264

7 Claims. (Cl. 164—61)

This invention relates to a machine for cutting sheet solder into flakes, and an object of the invention is to provide automatic mechanism for this purpose that will rapidly cut a sheet of solder into particles of a predetermined size corresponding to the particular piece required for a certain soldering operation. Another object of the invention resides in adjustable features of the machine whereby the size of the flakes of solder may be changed to meet a variety of requirements thereby avoiding unnecessary waste. Other objects and advantages of the invention will be apparent throughout the following specification.

In the manufacture of jewelry, and particularly insignia for the armed forces of the nation, a large quantity of silver solder is used and which is relatively expensive. Manufacturers sometimes cut sheets of solder by hand into particles of different sizes. An operator would then select a flake that appeared to be the proper amount for his purpose. This method of cutting the solder sheets is slow and wasteful. The particles lacked uniformity where many of a similar size are needed for a particular operation in large quantity production.

These difficulties are overcome and the above objects attained by the machine of this invention in which a sheet of solder may be inserted between a pair of intermittently driven rollers that first cut the sheet into ribbons and then feed the same beneath a pivoted knife blade adapted to be oscillated in staggered relation to the periodic movement of said rollers, and cut the ribbons transversely of the sheet into flakes of the desired sizes.

The rollers are driven by a one-way ball clutch operated by the upward movement of the knife blade, with intervening lost motion that may be varied to a desired extent in order to regulate the amount of metal cut off by the knife.

The invention will be more fully understood from the following detail description reference being had to the accompanying drawings forming a part of this specification, and in which drawings, Fig. 1 is a front elevation of a machine illustrating an embodiment of the invention.

Fig. 2 is a plan view of the same.

Fig. 3 is a detail end elevation of the clutch element for operating the rollers, as viewed in the direction of the arrow 3 of Fig. 2, and with its cover plate removed.

Fig. 4 is an end view of the machine looking from the right of Fig. 1, with the knife shown in section and with parts omitted.

Fig. 5 is an enlarged detail sectional view on the line 5—5 of Fig. 2, and,

Fig. 6 is a still further enlarged detail section on the line 6—6 of Fig. 5.

Referring to the drawings, the mechanism is supported on a frame 10 consisting of a bed plate 11 and a pedestal 12 secured thereto and having integral uprights 13 and 13' which are joined at their upper ends by a cross bar 14. Journalled in the uprights 13 and 13' is a transverse shaft 15. A gear 16 is secured to the shaft 15 at one end, and the driven member 17 of a ball clutch 18 is secured to the opposite end of shaft 15. A roller 19 is keyed to shaft 15 between the uprights 13, 13', and is formed with a plurality of equally spaced integral rings 20 with annular grooves 21 therebetween. Roller 19 is suitably spaced between uprights 13, 13' by means of collars 22.

Beneath shaft 15 and parallel thereto in vertical alignment, is a shaft 23 which is journalled in blocks 24 slidably mounted in slots 25 formed respectively in the uprights 13, 13', and adjustable therein by means of bolts 26 and lock nuts 27. Secured to shaft 23 is a gear 28 which is in mesh with gear 16 so that when motion is imparted to shaft 15 in a counter-clockwise direction as viewed in Fig. 4, shaft 23 will be rotated clockwise. A roller 30 is keyed to shaft 23 and is similarly formed with a plurality of rings 31, and a series of annular grooves 32 therebetween which are in alignment with the rings 20 of the roller 19. Likewise, rings 31 are aligned with the grooves 21 of roller 19. Spacing collars (not shown) may be used for this purpose such as the collars 22 for roller 19. By suitably adjusting the bolts 26 the respective rings and grooves of the rollers may be brought into slightly overlapping relationship so that when a sheet of solder S is drawn through the rollers it will be slit where a ring on one roller enters a groove on the other, the resulting ribbons of metal corresponding in width to that of the rings and grooves.

Means are provided for guiding the sheet of solder into the bite of the rollers. For this purpose there is a table 23 supported across the front of the machine on extensions 34 of the uprights 13, 13'. A transverse groove 35 forms a slideway for a pair of adjustable guide plates 36, each having a rib 37 fitting within the groove 35. Table 33 has slots 38 through which thumb screws 39 pass, the latter being threaded in the plates 36 which may thus be suitably shifted across the table and then clamped securely in place. A portion of the lower surface of the plates is cut away along their opposed inner edges to provide overhanging ends 40 spaced from the top of the table 33, and guiding surfaces 40', suitable for the insertion and guidance of the sheet of solder into proper registration with the cutting rings.

A plurality of floating stripper rings 41, larger in diameter than roller 19, are mounted loosely within the grooves 21 beneath the shaft 15, and extend eccentrically above the roller 19. Similarly, stripper rings 42 are mounted in the grooves 32 of roller 30 above shaft 23, and extend eccentrically below roller 30, one set of rings being staggered with respect to the other set as shown in Figs. 1 and 6. They are all thin enough respecting the depth of the grooves 21 and 32 to allow slight clearance beyond the amount required for the shearing action of the rollers to cut the ribbons indicated at R in Fig. 5.

As clearly shown in Figs. 4 and 5, the stripper rings 41 and 42 are eccentrically in vertical opposition, and function to prevent the ribbons R from following the contour of the respective rollers when revolving in the direction indicated by the arrows, and toward which they are inherently thrust by the rings 21 or 32. The stripper rings rotate idly in the same direction as their associated rollers, but any tendency to swing backwardly out of their cross-axial alignment with shafts 15 and 23 is arrested by the adjacent flanges 43 and 44 extending perpendicularly in opposite directions from the inner edge of table 33. Flange 43 is slotted at 43' for the passage of the sheet of solder.

A sheer plate 45 extends across the machine between uprights 13, 13' and is supported on the cross bar 14 to which it is secured. Its forward vertical face is aligned with the front edge of slots 46 and 47 in the uprights, and within which slots there is mounted a knife 48 for cutting the ribbons R transversely. Knife 48 is pivoted at one end to the upright 13 by a bolt 49 having a spring 50 coiled around it effective for urging the knife against the vertical face of the plate 45. The other end of the knife 48 is pivoted at 51 to a depending pitman 52 which is pivoted at 53 to a crank disk 54 mounted on a shaft 55 driven through suitable reduction gearing by a motor 56 supported on the bed plate 11.

Ball clutch 18 consists of the driven member 17 and a driver member 60. Member 17 is a disk with bosses 61 and 62 projecting respectively from its opposite faces, and bored through to fit on shaft 15 to which member 17 is secured by a set screw 63. Its circumference is cut away to form notches 64 with defining surfaces 65 and 66. Surfaces 65 constitute shoulders spaced 120 degrees apart, and are bored to receive pins 67 urged outwardly by springs 68. The surfaces 66 are tangent to a circle centering in the bore through bosses 61 and 62.

Member 60 consists of a cylindrical casing having a wall 69 bored to receive boss 61 of member 17, and about which boss member 60 is adapted to oscillate. Extending outwardly from wall 69 is an annular rim 70 which overlies the perimeter of member 17 and forms an outer wall for the notches 64. Each notch 64 contains a ball 71. The balls are engaged by the pins 67 and thereby urged away from surfaces 65 toward the converging walls of notches 64. A cover plate 17' provides an enclosing outer wall for the notches 64. An arm 72 projects radially from the rim 70 over and into the path of travel of the knife 48.

It will now be apparent that upon each revolution of the crank disk 54 knife 48 will be rocked and will engage and lift arm 72, the latter being retracted by a spring 73 secured to its outer end and to the upright 13'; and that the counterclockwise rotation of member 60 (Fig. 3) as a result of the lifting of arm 72, will simultaneously effect the rotation of member 17, through the clutching action of the balls 71, and also the shafts 15 and 23 and their associated rollers in the direction indicated by the arrows in Fig. 4.

Means are provided for limiting the retractile movement of the arm 72 toward the knife 48 consisting of a bolt 74 threaded through arm 72 and projecting beyond the same so as to engage the flattened side of a stop pin 75 extending from upright 13'. By suitably adjusting the bolt 74 the top surface of the knife 48 will engage arm 72 earlier or later as the case may be, and clutch 18 will be operated accordingly to a greater or lesser extent thereby effecting a corresponding movement of rollers 19 and 30 during which a predetermined length of the ribbons R of solder sheet S will be fed beyond the cutting edge of the knife 48 to be subsequently cut into the relatively small flakes F indicated in Fig. 5. It will be understood that during the downward cutting movement of knife 48 the rollers 19 and 30 remain stationary because the return movement of member 60 does not actuate member 17. In this manner the cutting movement of the knife 48 will be staggered with respect to the feeding movement of the rollers, and since the knife is the controlling factor, such relative movement of the parts will at all times be synchronized regardless of changes in the adjustment of bolt 74 to change the sizes of the cut flakes.

The ribbons that alternately diverge upwardly as the result of the cutting thrust of rings 32 are deflected toward the shear plate 45 by a guide member 76 suspended across the machine between uprights 13, 13'. For this purpose member 76 is fashioned to provide a downwardly inclined portion 77 along which the ribbons slide toward and through the narrow space 78 between the shear plate 45 and the adjacent lower edge 77' of member 76. Conversely, the other ribbons that diverge downwardly engage and slide along the top of shear plate 45. They likewise then pass through the space 78 and into the path of the knife 48. The lower edge 77' of member 76 defining the top of the space 78, prevents all of the ribbons R from following the upward movement of knife 48.

The embodiment of the invention shown herein is intended to be illustrative and not to be taken in a sense of limitation, as various modifications within the scope of the appended claims may readily suggest themselves to those skilled in the art.

I claim:

1. In a machine of the class described, a pair of geared rollers fashioned to advance and cut a sheet of metal into ribbons, a pivoted knife blade adapted to cut said ribbons transversely into flakes, means for oscillating said knife blade, and actuating means responsive to movements of the knife blade and operated thereby alternately with respect to the cutting stroke thereof for intermittently driving said rollers.

2. In a machine of the class described, a pair of geared rollers fashioned to advance and cut a sheet of metal into ribbons, a pivoted knife blade adapted to cut said ribbons transversely into flakes, means for oscillating said knife blade, and actuating means for intermittently driving said rollers comprising a driven member operatively connected to one of said rollers, and an oscillatory one-way driver member, the latter being responsive to movements of said knife blade and operated thereby alternately with respect to the cutting stroke thereof.

3. In a machine of the class described, a pair of geared rollers fashioned to advance and cut a sheet of metal into ribbons, a pivoted knife blade adapted to cut said ribbons transversely into flakes, means for oscillating said knife blade, actuating means for intermittently driving said rollers having a member thereof engageable by the knife blade and operated alternately with respect to the cutting stroke thereof, and means for changing the normal relative position of the engageable member of said actuating means and said knife blade to lengthen or shorten the feeding movement of said rollers and correspondingly change the size of said flakes.

4. In a machine of the class described, a pair of geared rollers fashioned with a plurality of engaging rings and intermediate annular grooves operative to advance and cut a sheet of metal into ribbons, a pivoted knife blade adapted to cut said ribbons transversely into flakes, means for oscillating said knife blade, actuating means for intermittently driving said rollers responsive to movements of the knife blade and operated thereby alternately with respect to the cutting stroke thereof, a plurality of stripper rings larger in diameter than said rollers and loosely mounted in the respective grooves thereof so as to extend eccentrically away from said rollers in opposite directions, whereby said ribbons will pass between said groups of stripper rings and be divergently stripped from said grooves, and means for convergently guiding said ribbons into the cutting plane of said knife blade.

5. A machine of the class described comprising a pair of geared rollers fashioned with a plurality of engaging rings and intermediate annular grooves operative to advance and cut a sheet of metal into ribbons, adjustable means for guiding and registering the edges of said sheet with the edges of the corresponding rings of said rollers, a pivoted knife blade adapted to cut said ribbons transversely into flakes, means for oscillating said knife blade, actuating means for intermittently driving said rollers responsive to movements of said knife blade and operated thereby alternately with respect to the cutting stroke thereof, means for stripping said ribbons from the respective grooves of said rollers, and further means for guiding said ribbons into the cutting plane of said knife blade.

6. In a machine of the class described, a pair of geared rollers fashioned with a plurality of engaging rings and intermediate annular grooves operative to advance and cut a sheet of metal into ribbons, a table provided with adjustable means for guiding and aligning the edges of said sheet with the edges of the corresponding rings of said rollers, a pivoted knife blade adapted to cut said ribbons into flakes, crank means for oscillating said knife blade, ball-clutch means for intermittently driving said rollers comprising a driven member operatively connected to one of said rollers, and an oscillatory driver member mounted on the driven member, ball elements effective therebetween for one-way operation, an arm extending from the driver member into the path of said knife blade and engageable thereby to effect said intermittent movement of the rollers alternately with respect to the cutting stroke of said knife blade, a stop for said arm to provide lost motion between the same and the knife blade, spring means effective for urging said arm toward said stop, adjusting means for increasing or diminishing the extent of said lost motion to commensurately change the feeding movement of the rollers and the size of said flakes, a plurality of stripper rings larger in diameter than said rollers and loosely mounted in the respective grooves thereof so as to extend eccentrically away from said rollers in opposite directions, whereby said ribbons will pass between said groups of stripper rings and be divergently stripped from said grooves, and means for convergently guiding said ribbons into the cutting plane of said knife blade.

7. In a machine of the class described, a pair of geared rollers fashioned with a plurality of engaging rings and intermediate annular grooves operative to advance and cut a sheet of metal into ribbons, a table provided with adjustable means for guiding and aligning the edges of said sheet with the edges of the corresponding rings of said rollers, a pivoted knife blade adapted to cut said ribbons transversely into flakes, crank means for oscillating said knife blade, ball-clutch means for intermittently driving said rollers comprising a driven member operatively connected to one of said rollers, and an oscillatory driver member mounted on the driven member, ball elements effective therebetween for one-way operation, an arm extending from the driver member into the path of said knife blade and engageable thereby to effect said intermittent movement of the rollers alternately with respect to the cutting stroke of said knife blade, a stop for said arm to provide lost motion between the same and the knife blade, spring means effective for urging said arm toward said stop, adjusting means for increasing or diminishing the extent of said lost motion to commensurately change the feeding movement of the rollers and the size of said flakes, a plurality of stripper rings larger in diameter than said rollers and loosely mounted in the respective grooves thereof so as to extend eccentrically away from said rollers in opposite directions, flanges supported in confronting relation to said stripper rings adapted to stabilize said rings during the actuation of the rollers, whereby said ribbons will pass between said groups of stripper rings and be divergently stripped from said grooves, and means for convergently guiding said ribbons into the cutting plane of said knife blade.

DAVID KELLER.